US012804214B2

(12) United States Patent
Brandstetter

(10) Patent No.: US 12,804,214 B2
(45) **Date of Patent: *Nov. 17, 2026**

(54) SYSTEMS AND METHODS FOR DEFINING AD SPACES IN VIDEO

(71) Applicant: IPAR, LLC, San Francisco, CA (US)

(72) Inventor: Jeffrey D. Brandstetter, San Francisco, CA (US)

(73) Assignee: IPAR, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/236,415

(22) Filed: Jun. 12, 2025

(65) Prior Publication Data

US 2026/0101076 A1 Apr. 9, 2026

Related U.S. Application Data

(63) Continuation of application No. 17/985,212, filed on Nov. 11, 2022, now Pat. No. 12,356,033, which is a (Continued)

(51) Int. Cl.

*H04N 21/262* (2011.01)
*G06Q 30/02* (2023.01)

(Continued)

(52) U.S. Cl.

CPC ....... *H04N 21/26233* (2013.01); *G06Q 30/02* (2013.01); *H04N 21/234345* (2013.01); *H04N 21/235* (2013.01); *H04N 21/4316* (2013.01); *H04N 21/4331* (2013.01); *H04N 21/435* (2013.01); *H04N 21/4784* (2013.01);

(Continued)

(58) Field of Classification Search

CPC ........... G06Q 30/02; H04N 21/234345; H04N 21/235; H04N 21/26233; H04N 21/4316; H04N 21/4331; H04N 21/435; H04N 21/4784; H04N 21/4882; H04N 21/812; H04N 21/8455

See application file for complete search history.

(56) References Cited

U.S. PATENT DOCUMENTS 5,691,975 A * 11/1997 Hamada .............. H04L 12/5602 370/232
6,085,164 A 7/2000 Smith et al.

(Continued)

OTHER PUBLICATIONS

International Search Report & Written Opinion for PCT/US2014/023146, dated Jul. 15, 2014.

*Primary Examiner* — Michael B. Pierorazio
(74) *Attorney, Agent, or Firm* — Jones Day

(57) ABSTRACT

Computer-implemented systems and methods are provided for defining ad space in a video. For example, a computer can receive an identification of a video and an advertisement space definition that includes a time stamp for the advertisement space in the video and an advertisement length. The computer can receive a request to view the video. The computer can determine an advertisement to play in the advertisement space such that the advertisement is not longer than the advertisement length included in the video's advertisement space definition. The computer can provide access to the video, and when the video reaches the time stamp, the advertisement is played in the advertisement space.

20 Claims, 4 Drawing Sheets

Related U.S. Application Data continuation of application No. 16/517,907, filed on Jul. 22, 2019, now Pat. No. 11,509,948, which is a continuation of application No. 14/834,945, filed on Aug. 25, 2015, now Pat. No. 10,405,019, which is a continuation of application No. 14/204,613, filed on Mar. 11, 2014, now Pat. No. 9,124,948.

(60) Provisional application No. 61/789,477, filed on Mar. 15, 2013.

(51) Int. Cl.

*H04N 21/2343* (2011.01)
*H04N 21/235* (2011.01)
*H04N 21/431* (2011.01)
*H04N 21/433* (2011.01)
*H04N 21/435* (2011.01)
*H04N 21/4784* (2011.01)
*H04N 21/488* (2011.01)
*H04N 21/81* (2011.01)
*H04N 21/845* (2011.01)

(52) U.S. Cl.

CPC ....... *H04N 21/4882* (2013.01); *H04N 21/812* (2013.01); *H04N 21/8455* (2013.01)

(56) References Cited

U.S. PATENT DOCUMENTS 6,175,378 B1 * 1/2001 Maillard ............ H04N 7/17318 348/E7.071
6,567,415 B1 * 5/2003 Elwalid .............. H04Q 11/0478 370/468
6,909,837 B1 6/2005 Unger
7,039,930 B1 5/2006 Goodman et al.
7,660,737 B1 2/2010 Lim et al.
7,668,950 B2 2/2010 Horowitz et al.
7,739,712 B2 * 6/2010 Boyden ............... H04L 63/0428 725/138
7,747,982 B1 * 6/2010 Sie ..................... H04N 21/4334 725/87
7,774,468 B1 * 8/2010 Nag .................... H04L 47/2408 709/224
7,844,985 B2 11/2010 Hendricks et al.
7,979,318 B1 7/2011 Morton et al.
8,170,913 B1 5/2012 Baluja
8,175,941 B2 5/2012 Pien
8,175,950 B1 5/2012 Grebeck et al.
8,375,414 B2 * 2/2013 Covey ................. H04L 12/1827 725/86
8,423,660 B2 * 4/2013 Leung .................... H04H 20/16 370/312
8,451,804 B2 * 5/2013 Vujcic ....................... H04L 1/00 370/336
8,542,642 B2 * 9/2013 Lin ......................... H04L 5/006 455/452.2
8,935,243 B2 1/2015 Marshall
8,990,108 B1 3/2015 Mann et al.
9,078,048 B1 7/2015 Gargi et al.
9,124,948 B2 9/2015 Brandstetter
9,286,397 B1 3/2016 Suleman et al.
2002/0083444 A1 6/2002 Blasko et al.
2002/0100041 A1 7/2002 Rosenberg et al.
2003/0149618 A1 8/2003 Sender et al.
2003/0188317 A1 10/2003 Liew et al.
2004/0093394 A1 5/2004 Weber et al.
2004/0267806 A1 12/2004 Lester
2005/0002405 A1 * 1/2005 Gao ................... H04N 21/6405 375/E7.025
2005/0071882 A1 * 3/2005 Rodriguez ......... H04N 21/2393 348/E7.071
2006/0095281 A1 5/2006 Chickering et al.
2006/0111968 A1 5/2006 Cline et al.
2006/0212350 A1 9/2006 Ellis et al.
2007/0198111 A1 8/2007 Oetzel et al.
2008/0052219 A1 2/2008 Sandholm et al.
2008/0097838 A1 4/2008 Lin et al.
2008/0167943 A1 7/2008 O'Neil et al.
2008/0187279 A1 8/2008 Gilley et al.
2008/0228564 A1 9/2008 de Heer et al.
2008/0250448 A1 10/2008 Rowe et al.
2008/0275770 A1 11/2008 Kitts
2009/0006375 A1 1/2009 Lax et al.
2009/0150224 A1 6/2009 Lu et al.
2009/0150930 A1 6/2009 Sherwin et al.
2009/0183213 A1 * 7/2009 Mukerji ............... H04N 21/431 725/100
2009/0210899 A1 8/2009 Lawrence-Apfelbaum et al.
2009/0299832 A1 12/2009 Manchala et al.
2009/0313652 A1 12/2009 Connery et al.
2010/0088716 A1 4/2010 Ellanti et al.
2010/0121671 A1 5/2010 Boutilier et al.
2010/0138264 A1 6/2010 Faris et al.
2010/0145763 A1 6/2010 Swanson
2010/0166389 A1 7/2010 Knee et al.
2010/0174609 A1 7/2010 Bax et al.
2010/0175079 A1 7/2010 Braun et al.
2010/0191600 A1 7/2010 Sideman
2010/0257054 A1 10/2010 Martin et al.
2010/0324992 A1 12/2010 Birch
2011/0040617 A1 2/2011 Moonka
2011/0099077 A1 4/2011 Darin et al.
2011/0107368 A1 5/2011 Rouse et al.
2011/0123173 A1 5/2011 Ruffini et al.
2011/0145070 A1 6/2011 Wolinsky et al.
2011/0213655 A1 9/2011 Henkin et al.
2011/0219402 A1 9/2011 Candelore et al.
2011/0251885 A1 10/2011 Abigail
2011/0289531 A1 11/2011 Moonka et al.
2011/0317977 A1 12/2011 Harris
2012/0089456 A1 4/2012 Gupta et al.
2012/0131622 A1 * 5/2012 Mcdysan ........... H04N 21/6405 725/95
2012/0143701 A1 6/2012 Reis et al.
2012/0158461 A1 6/2012 Aldrey et al.
2012/0179536 A1 7/2012 Kalb et al.
2012/0185899 A1 * 7/2012 Riedl ................. H04N 21/2405 725/35
2012/0233644 A1 * 9/2012 Rao .................. H04M 1/72412 725/62
2012/0281963 A1 11/2012 Krapf et al.
2013/0014153 A1 1/2013 Bhatia et al.
2013/0060631 A1 3/2013 Corson et al.
2013/0066725 A1 3/2013 Umeda
2013/0080264 A1 3/2013 Umeda
2013/0085869 A1 4/2013 Carlson et al.
2013/0124308 A1 5/2013 Hegeman et al.
2014/0009680 A1 1/2014 Moon et al.
2014/0020017 A1 1/2014 Stern et al.
2014/0082660 A1 3/2014 Zhang et al.
2014/0143806 A1 5/2014 Steinberg et al.
2014/0180829 A1 6/2014 Umeda
2014/0229273 A1 8/2014 Garcia-Martinez et al.
2016/0312234 A1 10/2016 Varian
2017/0140421 A1 5/2017 Filev et al.
2021/0385528 A1 * 12/2021 Sandholm ........ H04N 21/44222

* cited by examiner

SYSTEMS AND METHODS FOR DEFINING AD SPACES IN VIDEO

CROSS-REFERENCE TO RELATED APPLICATIONS

This application is a continuation of U.S. patent application Ser. No. 17/985,212, filed Nov. 11, 2022, which is a continuation of U.S. patent application Ser. No. 16/517,907, filed Jul. 22, 2019, which is a continuation of U.S. patent application Ser. No. 14/834,945, filed Aug. 25, 2015, which is a continuation of U.S. patent application Ser. No. 14/204,613, filed on Mar. 11, 2014, which claims priority to U.S. Provisional Application No. 61/789,477, filed Mar. 15, 2013, the entirety of which is herein incorporated by reference.

FIELD

The technology described herein relates generally to video advertisement and more specifically to defining advertisement space in a video.

BACKGROUND

Advertisements are increasingly being displayed to viewers concurrently with a primary content (e.g., a television show, video clip, etc.). Often this takes the form of the advertisement being displayed in a fixed area of the display window, such as at the bottom of the window, and at a fixed time. The inflexibility, however, may often result in a suboptimal advertisement or viewing experience. For example, the advertisement may cover important aspects of the primary content, which may annoy viewers, or it may be displayed during an inopportune time, resulting in viewers paying little attention to the advertisement. Thus, in order to improve the effectiveness of advertisements, a more flexible approach to controlling an advertisement's placement and timing is needed.

SUMMARY

In accordance with the teachings herein, computer-implemented systems and methods are provided for defining ad space in a video. For example, a computer can receive an identification of a video and an advertisement space definition that includes a time stamp for the advertisement space in the video and an advertisement length. The computer can receive a request to view the video. The computer can determine an advertisement to play in the advertisement space such that the advertisement is not longer than the advertisement length included in the video's advertisement space definition. The computer can provide access to the video, and when the video reaches the time stamp, the advertisement is played in the advertisement space.

DETAILED DESCRIPTION

Figure 1:
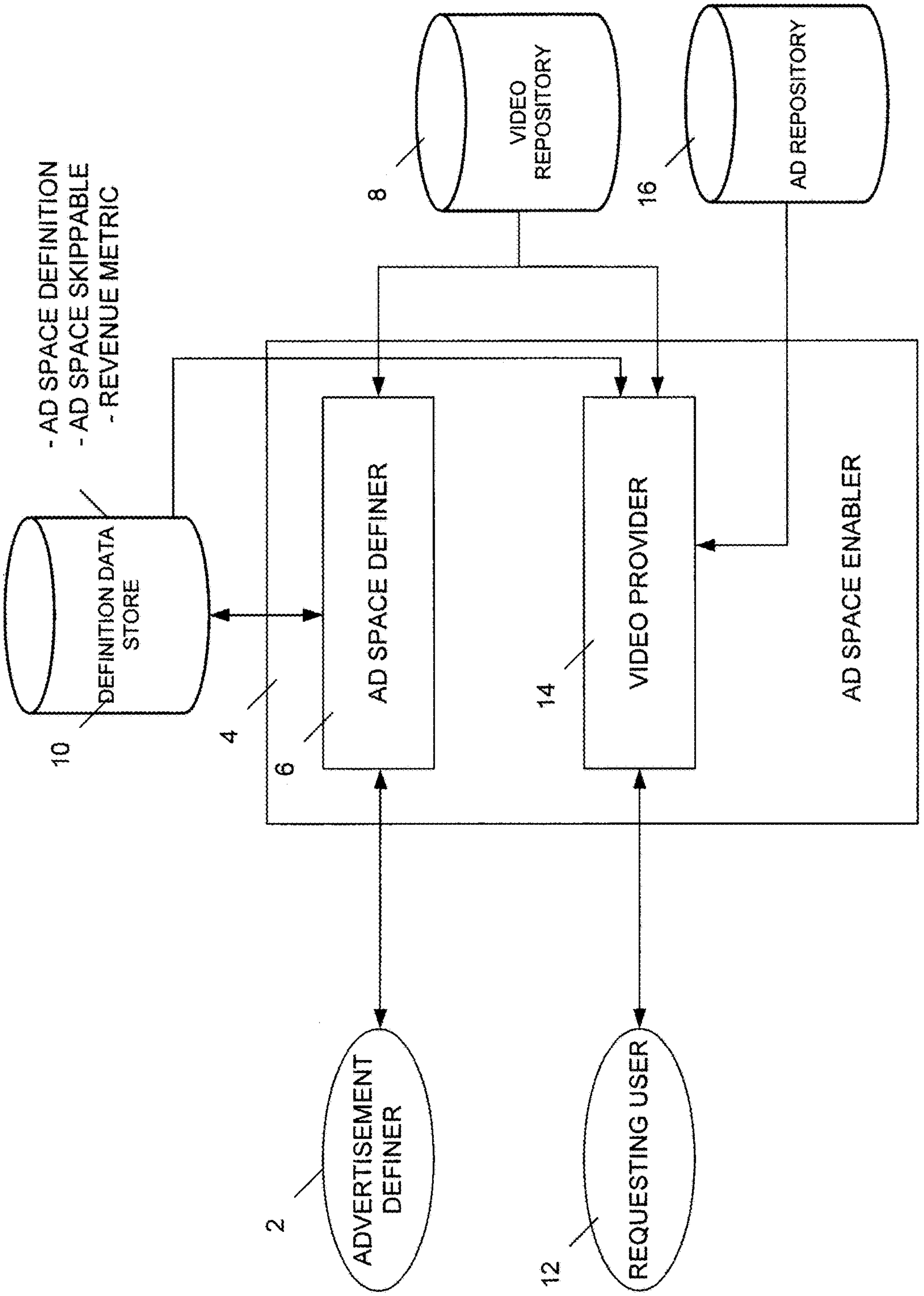
FIG. 1 depicts a computer-implemented environment for defining ad space in a video.

FIG. 1 is a block diagram depicting a computer-implemented ad space enabler 4. An ad space enabler 4 facilitates an advertisement definer 2 to maximize generated revenue for advertisements displayed during a video while not significantly compromising the watchability of the video (e.g., automatically playing a commercial mid-sentence in the video). An advertisement definer 2 accesses an ad space enabler 4 to define advertisement space windows in a video, where advertisements are displayed during the defined advertisement spaces to generate revenue for a rights holder, such as a video creator. An ad space definer 6 receives an identification of a video, such as a video stored in a video repository 8, and an advertisement space definition. The advertisement space definition may include a time stamp of a point in the identified video and an advertisement length. The advertisement space definition is stored in a data store, such as definition data store 10. Upon receiving a request to view the video for which the advertisement space has been defined, such as a request from a requesting user 12, a video provider 14 determines an advertisement from an advertisement repository 16 to play in the advertisement space that has been defined for the requested video. The video provider 14 may consider the advertisement length parameter of the advertisement space definition in selecting the advertisement to be played. For example, the video provider 14 may select an advertisement that is no longer than the advertisement length provided in the advertisement space definition. The video provider 14 provides access to the video, where when the video reaches the time stamp indicated in the advertisement space definition, the advertisement is played within the advertisement space time period.

The advertisements displayed in the advertisement space may take a variety of forms. For example, the advertisement may be a video advertisement. In one example, when the video reaches the time stamp of the advertisement space definition, the video is paused, and the video advertisement is played. The video then resumes upon completion of the video advertisement. In another example, the advertisement is a text or graphic overlay advertisement. The use of a text or graphic overlay advertisement may enable continuous display of the requested video, even during the advertisement space time period.

In some implementations, the advertisement space definition may include a flag that indicates whether advertisements played in the associated advertisement space are permitted to be skipped. For example, the advertisement definer 2 may specify that certain advertisement spaces may be filled with advertisements that can be skipped. While skippable advertisements may produce less revenue, they may encourage continued viewing of the video in those instances where a user might otherwise discontinue viewing upon advertisement presentation. When an advertisement space is flagged as skippable, the advertisement displayed during that space may be stopped or removed upon user request (e.g., by a user clicking a 'skip' link or an 'x' link displayed with the advertisement).

As noted above, the display of advertisements during a video may produce revenue for an entity providing video access, as well as for a rights holder of the particular video being played (e.g., an advertiser pays 3 cents per display of an advertisement, where 1 cent is retained by the entity providing access and 2 cents is paid to the video rights holder per advertisement impression). Revenue per impression of an advertisement during display of a video may vary based on a variety of factors. For example, longer advertisements may earn more revenue than shorter advertisements. Additionally, advertisements that are skipped or only partially viewed may earn less or no revenue. Further, revenue earned may be based on the placement of an advertisement within a video. For example, an advertisement displayed near the climax of a video may earn more revenue than an advertisement placed near the beginning of the video or during the credits of the video, since the level of engagement and likelihood of paying attention to the advertisement is presumably higher at the climax of the video.

With revenue being potentially based on one or more of the timing of an advertisement, the length of an advertisement, and whether an advertisement is skippable, all parameters that may be controlled by an advertisement definer 2, an ad space enabler 4 can provide expected revenue values to the advertisement definer 2 during ad space definition to facilitate more informed advertisement space definition. For example, an ad space definer 6 may provide a graphical user interface to the advertisement definer 2 that displays a video identified by the advertisement definer 2 as well as an expected revenue value. For example, the interface may provide an expected revenue for a current advertisement space being defined or for all of the advertisement spaces defined for the particular video. The expected revenue displayed in the user interface may be displayed and updated in real time as the advertisement definer 2 defines an ad space, such as through modification to the advertisement space's location within a video or modification to the length of the ad space. For example, the advertisement definer 2 may be provided with a depiction of a selected video along with a time line of the video. When the advertisement definer selects a time stamp, such as by clicking on the timeline or typing in a time stamp value, along with an advertisement length, the ad space definer 6 computes an expected revenue, such as an expected revenue per display of the video, based on the advertisement space definition. That expected revenue may be based on the time stamp (e.g., whether the advertisement space is placed at a point of high or low viewer engagement in the video) and the length of the video. The expected revenue may also be based on whether the advertisement space is flagged as skippable. The advertisement definer 2 may iteratively adjust the advertisement space definition, such as based on the displayed expected revenue to maximize expected revenue.

In another example, the advertisement definer 2 may indicate a desired expected revenue, such as via an expected revenue slide bar. When an advertisement definer 2 adjusts the desired expected revenue, one or more parameters of one or more defined advertisement spaces can automatically be adjusted. For example, when an advertisement definer 2 decreases a desired expected revenue, a length of a defined advertisement space may be shortened. In another example, when an advertisement definer 2 commands an increase in the desired expected revenue, a defined advertisement space may be lengthened or moved to a more lucrative position within the video, such as nearer to the climax or other critical scene or important point in the video.

A video provider 14 is responsive to requests to view videos from requesting users 12. For example, a requesting user 12 may indicate interest in viewing a video through clicking on a link on a social media site, in an e-mail, or on a website. The video provider 14 receives the request and accesses the definition data store 10 to determine whether any advertisement spaces have been defined for the selected video. If an advertisement space has been defined, the video provider 14 selects an appropriate advertisement from an advertisement repository 16 based on the parameters of the ad space definition. For example, the video provider 14 may base its advertisement selection based on one or more of the length of the advertisement space specified in the advertisement space definition, the type of advertisement specified in the advertisement space definition (e.g., a graphic overlay advertisement or a potentially more lucrative video advertisement), or any content restrictions on the advertisement (e.g., an advertisement definer 2 could specify that a "Mature" advertisement should not be played during an advertisement space defined in a "Children's" video). The video provider 14 then provides access to the video, where when the video reaches the time stamp of a defined advertisement space, the advertisement is played in the advertisement space. An account of the video provider and the video rights holder may be credited upon display of an advertisement. For example, accounts may be credited after completion of display of an advertisement. In another example, accounts may be credited when the video reaches the time stamp. In a further example, the accounts may be credited only when the advertisement is played for the full length, or the accounts may be played for a partial amount (e.g., a pro rata share when an advertisement is partially displayed or skipped).

While the examples described herein are directed to definition of advertisement spaces within videos, the systems and methods apply to other content types as well. For example, advertisement spaces can be defined in content that is audio, video, still image, or hybrid combinations thereof.

Figure 2:
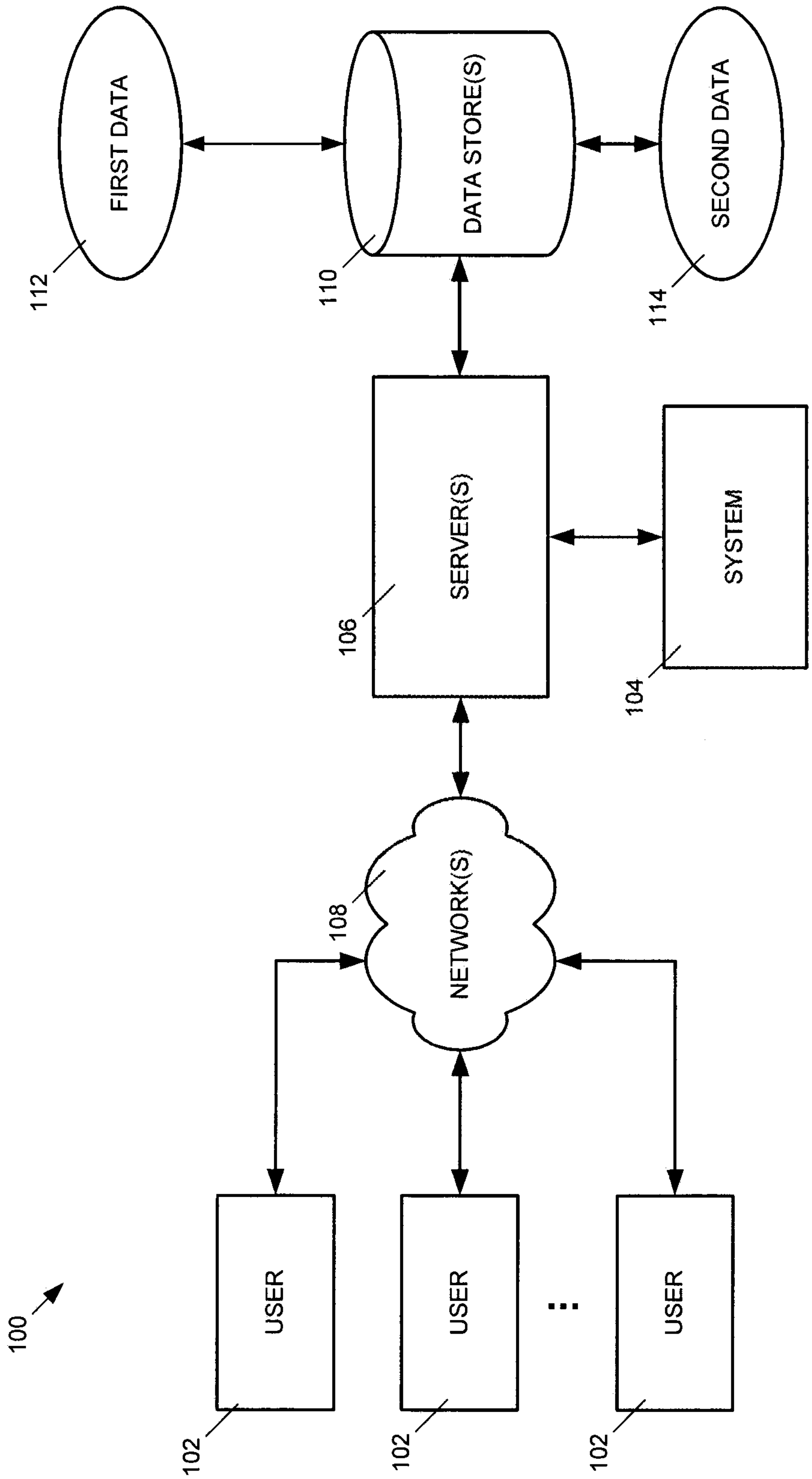
FIG. 2 depicts a computer-implemented environment for a user to access an ad space enabler through a network.

FIG. 2 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 3A:
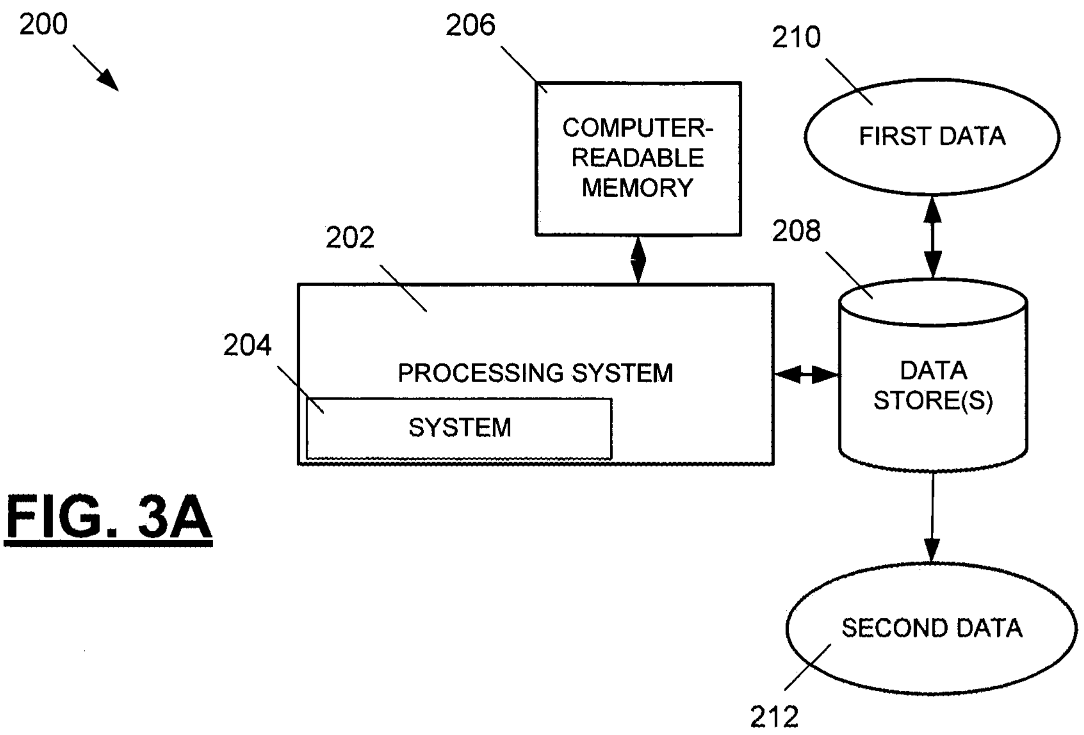
FIGS. 3A, 3B, and 3C depict example systems for use in implementing an ad space enabler.
Figure 3B:
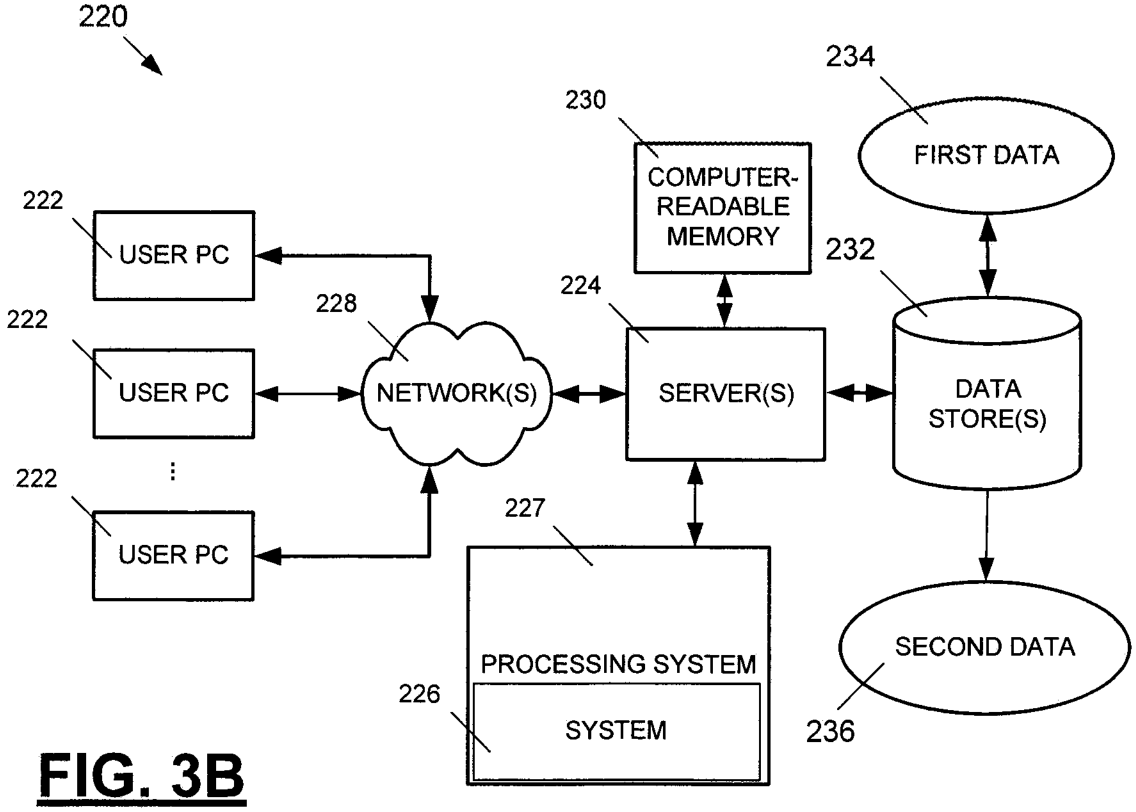
Figure 3C:
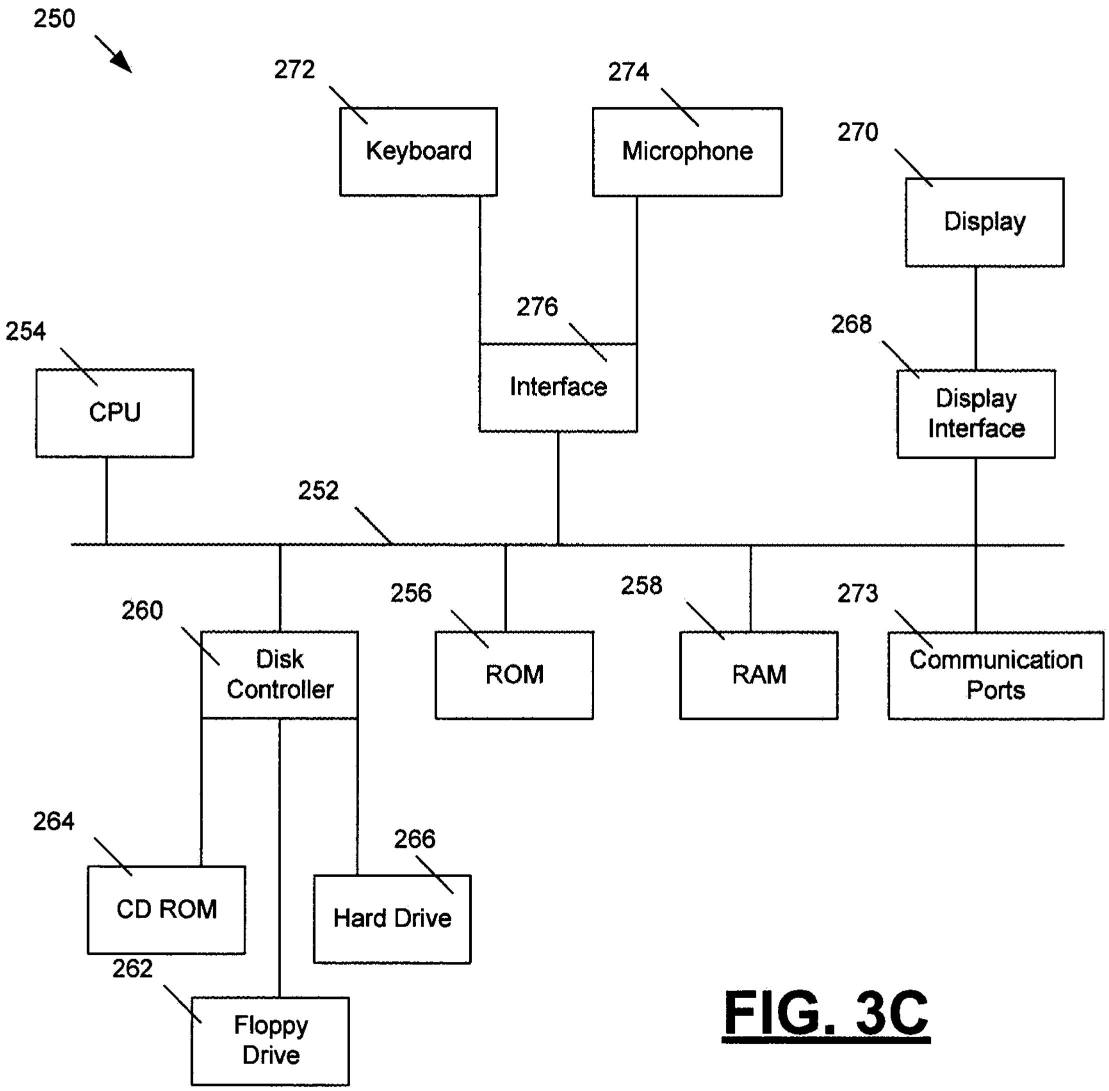

FIGS. 3A, 3B, and 3C depict example systems for use in implementing a system. For example, FIG. 3A depicts an exemplary system 200 that includes a stand alone computer architecture where a processing system 202 (e.g., one or more computer processors) includes a system 204 being executed on it. The processing system 202 has access to a computer-readable memory 206 in addition to one or more data stores 208. The one or more data stores 208 may contain first data 210 as well as second 212.

FIG. 3B depicts a system 220 that includes a client server architecture. One or more user PCs 222 accesses one or more servers 224 running a system 226 on a processing system 227 via one or more networks 228. The one or more servers 224 may access a computer readable memory 230 as well as one or more data stores 232. The one or more data stores 232 may contain first data 234 as well as second data 236.

FIG. 3C shows a block diagram of exemplary hardware for a stand alone computer architecture 250, such as the architecture depicted in FIG. 3A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A processor-readable storage medium, such as read only memory (ROM) 256 and random access memory (RAM) 258, may be in communication with the processing system 254 and may contain one or more programming instructions. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 273.

In addition to the standard computer-type components, the hardware may also include data input devices, such as a keyboard 272, or other input device, such as a microphone 274, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method of transmitting media content across a computer network, comprising:

receiving an identification of media content and an adjustable advertisement space definition, wherein the advertisement space definition includes a time stamp for the advertisement space in the media content and an advertisement length, wherein the advertisement space definition is adjustable based on a displayed expected revenue associated with the time stamp and the advertisement length;

determining an advertisement to play in the advertisement space based on the advertisement length; and providing access to the media content, wherein when the media content reaches the time stamp, the advertisement is played in the advertisement space.

2. The method of claim 1, wherein the media content is video content, audio content, image content, or mixed media content.

3. The method of claim 1, wherein the media content is video content.

4. The method of claim 1, wherein the advertisement is a video advertisement.

5. The method of claim 3, wherein video is paused while the video advertisement is played.

6. The method of claim 3, wherein the advertisement is an overlay advertisement, wherein the video is not paused while the overlay advertisement is displayed.

7. The method of claim 1, wherein the advertisement space definition includes an indication as to whether the advertisement played in the ad space is skippable.

8. The method of claim 1, wherein when the advertisement is skippable, the advertisement can be stopped, removed, or bypassed upon user request.

9. The method of claim 1, wherein the time stamp of the advertisement space is adjusted by a content manager via a mouse click operation on a timeline of the media content.

10. The method of claim 1, wherein the expected revenue value is based on the time stamp, wherein the expected revenue value is greater when the time stamp is near a climax of the media content than when the time stamp is near the beginning of the media content or during credits of the media content.

11. The method of claim 1, wherein the expected revenue value is based on the advertisement length, wherein the expected revenue value is larger for longer advertisement lengths than for shorter advertisement lengths.

12. The method of claim 1, wherein the expected revenue value is larger when the advertisement is not flagged as skippable.

13. The method of claim 1, further comprising:

receiving an adjustment to the advertisement space definition after the expected revenue value is provided.

14. The method of claim 1, wherein the expected revenue value is an expected revenue per view of the video, revenue per thousand displays (CPM), revenue per user action, or revenue per click on the advertisement.

15. The method of claim 1, further comprising providing a graphical user interface that includes an expected revenue adjustment control, wherein a length of the advertisement space is automatically adjusted based on an adjustment received via the revenue adjustment control.

16. The method of claim 1, further comprising automatically selecting the advertisement from an advertisement repository based on the advertisement length of the advertisement space definition.

17. The method of claim 1, wherein the advertisement space definition further includes an advertisement content restriction, wherein the method includes automatically selecting the advertisement from an advertisement repository that complies with the advertisement content restriction.

18. The method of claim 1, further comprising:

crediting an account after completion of the advertisement.

19. A system for transmitting media content across a computer network, comprising:

one or more data processors;

one or more computer-readable mediums encoded with instructions for commanding the one or more data processors to execute steps that include:

receiving an identification of media content and an adjustable advertisement space definition, wherein the advertisement space definition includes a time stamp for the advertisement space in the media content and an advertisement length, wherein the advertisement space definition is adjustable based on a displayed expected revenue associated with the time stamp and the advertisement length;

determining an advertisement to play in the advertisement space, wherein the advertisement based on the advertisement length; and providing access to the media content, wherein when the media content reaches the time stamp, the advertisement is played in the advertisement space.

20. A non-transitory computer-readable medium encoded with instructions for commanding one or more data processors to execute steps for transmitting media content across a computer network, comprising:

receiving an identification of media content and an adjustable advertisement space definition, wherein the advertisement space definition includes a time stamp for the advertisement space in the media content and an advertisement length, wherein the advertisement space definition is adjustable based on a displayed expected revenue associated with the time stamp and the advertisement length;

determining an advertisement to play in the advertisement space, wherein the advertisement based on the advertisement length; and providing access to the media content, wherein when the media content reaches the time stamp, the advertisement is played in the advertisement space.

* * * * *